(12) United States Patent
Porod (10) Patent No.: US 11,975,467 B2
(45) Date of Patent: May 7, 2024

(54) ROTATING APPARATUS FOR A TOOL PART OF A SHAPING MACHINE

(71) Applicant: ENGEL AUSTRIA GmbH, Schwertberg (AT)

(72) Inventor: Florian Porod, St. Valentin (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 17/708,683

(22) Filed: Mar. 30, 2022

(65) Prior Publication Data
US 2022/0314506 A1  Oct. 6, 2022

(30) Foreign Application Priority Data

Apr. 1, 2021 (AT) .............................. A 50235/2021

(51) Int. Cl.
*B29C 45/04* (2006.01)

(52) U.S. Cl.
CPC ................. *B29C 45/045* (2013.01)

(58) Field of Classification Search
CPC ... B29C 45/2681; B29C 45/162; B29C 45/06; B29C 45/045; B29C 33/0083; B29C 45/04; B23Q 2220/004; B23Q 3/15722
USPC ........................................................ 425/135
See application file for complete search history.

(56) References Cited

U.S. PATENT DOCUMENTS

| | | | |
|---|---|---|---|
| 6,631,756 B1 | 10/2003 | Hegde | |
| 9,840,945 B2 | 12/2017 | Weber et al. | |
| 10,744,610 B2 | 8/2020 | Keibach | |
| 11,559,929 B2 | 1/2023 | Fiederle | |
| 2016/0305292 A1 | 10/2016 | Weber et al. | |
| 2018/0133857 A1 | 5/2018 | Keibach | |
| 2021/0213655 A1* | 7/2021 | Fiederle | ................ B29C 45/162 |
| 2022/0407273 A1* | 12/2022 | Egger | ................... H01R 39/643 |

FOREIGN PATENT DOCUMENTS

| | | |
|---|---|---|
| AT | 522792 | 2/2021 |
| CN | 1495889 | 5/2004 |
| CN | 101001735 | 7/2007 |
| CN | 105829662 | 8/2016 |

(Continued)

OTHER PUBLICATIONS

Yoshinori, English Translation of JP6132336 (Year: 2014).*

*Primary Examiner* — Galen H Hauth
*Assistant Examiner* — Hana C Page
(74) *Attorney, Agent, or Firm* — Wenderoth, Lind & Ponack, L.L.P.

(57) ABSTRACT

A rotating apparatus includes a rotary plate for mounting a tool part, a rotary shaft connected to the rotary plate, a rotary feedthrough including a stator, and a rotor connected to the rotary shaft for feeding through at least two media to the rotary plate. The rotor has a first rotor part for feeding through a first medium and a second rotor part for feeding through a second medium, and the first and the second rotor parts are thermally separated from each other. A first media routing for the first medium is in the form of a hose and/or pipe for the first medium from the first rotor part past the connecting part to the rotary plate. A connecting part is non-rotatably connected to the second rotor part and the rotary shaft. The hose and/or pipe extends from the first rotor part.

24 Claims, 7 Drawing Sheets

(56) References Cited

FOREIGN PATENT DOCUMENTS

| | | |
|---|---|---|
| CN | 106476204 | 3/2017 |
| CN | 107848089 | 3/2018 |
| CN | 207874696 | 9/2018 |
| CN | 110103390 | 8/2019 |
| CN | 210705677 | 6/2020 |
| CN | 111867802 | 10/2020 |
| CN | 211807441 | 10/2020 |
| DE | 10 2015 107 595 | 11/2016 |
| DE | 10 2018 110 223 | 10/2019 |
| DE | 10 2019 107 720 | 10/2019 |
| EP | 1 398 833 | 3/2004 |
| JP | 2010-184437 | 8/2010 |
| JP | 2014-188942 | 10/2014 |
| JP | 2015-217660 | 12/2015 |
| TW | 510296 | 11/2002 |
| TW | 284533 | 1/2006 |
| WO | 2019/206486 | 10/2019 |

\* cited by examiner

ROTATING APPARATUS FOR A TOOL PART OF A SHAPING MACHINE

BACKGROUND OF THE INVENTION

The present invention concerns a rotating apparatus for a tool part of a shaping machine, a closing unit for a shaping machine having at least one such rotating apparatus and a shaping machine having such a closing unit.

Rotating apparatuses for a tool part of a shaping machine are known both for rotary plates having a vertical axis of rotation and also for rotary plates having a horizontal axis of rotation. The tool part (which itself can be of a multi-part configuration) together with at least one further tool part forms a cavity for shaping a shaped part. If there is no possibility of a linear movement of the rotary plate, then the rotary plate is usually referred to as a turntable, while if a linear movement is involved, then reference is made to an index plate.

A rotating apparatus having an index plate is shown in DE 10 2019 107 720 A1.

In order to feed media to the rotary plate or to a tool part arranged on the rotary plate or to discharge the media therefrom (for simplicity hereinafter referred to as feedthrough), it is necessary to provide a rotary feedthrough having a stator and a rotor connected to the rotary plate. The media involve for example hydraulic oil, air or electrical signals or an electrical power supply and temperature-control media (usually water), wherein usually both a thermally resistant medium in the form of a temperature-control medium and at least one thermally sensitive medium, for example in the form of hydraulic oil, air and/or electrical signals and/or an electrical power supply, are fed to one and the same rotary plate.

As temperature-control media can be at temperatures of up to 180° C., it is necessary at least when using temperature-control media in a high temperature range to provide for thermal separation in relation to thermally sensitive media.

In the case of rotating apparatuses of the present applicant, it is already known that the rotor of the rotary feedthrough has a first rotor part for feeding through at least one first, thermally resistant medium of the at least two media, and a second rotor part for feeding through at least one in particular thermally sensitive second medium of the at least two media, wherein the first and second rotor parts are thermally separated from each other.

In those configurations the media are fed through in such way that the second rotor part serves for feeding through hydraulic oil and air and the first rotor part serves for feeding through temperature-control medium. The two rotor parts are in the form of shafts which have bores and which are flange-mounted to a rotary shaft carrying the rotary plate (the rotary shaft being in the form of a hollow shaft). Arranged at the rotary plate for the various media is a respective media distribution ring, wherein the two media distribution rings are thermally separated from each other. For the feedthrough of the temperature-control medium the arrangement has corrosion-resistant pipes which are not insulated and which lead to first media connections at the edge of the rotary plate. The feedthrough of hydraulic oil or air is effected from the media distributor ring by way of pipes (hydraulic oil) or hose lines (air) to second media connections at the edge of the rotary plate.

A problem here is that this structure requires a large number of bored shafts which are arranged in a row with each other, with interfaces and sealing elements. It is therefore highly cost-intensive and potentially susceptible to leakage of the media.

SUMMARY OF THE INVENTION

The object of the invention is to provide a rotating apparatus of the general kind set forth, in which the problems discussed in relation to the state of the art are avoided and to provide a closing unit for a shaping machine having at least one such rotating apparatus and a shaping machine having such a closing unit.

That object is attained by a rotating apparatus as described below, a closing unit for a shaping machine having at least one such rotating apparatus, and a shaping machine having such a closing unit.

The rotating apparatus according to the invention permits a feedthrough of temperature-control medium (for example water) as one of the media (for example as the first medium) at a temperature of up to 180° C. without this involving detrimental consequences for a thermally more sensitive further medium (for example a second medium) or thermally more sensitive further media (for example second media in the form of hydraulic oil, air and/or electrical signals and/or an electrical power supply). Preferably, the first and the second medium are mutually different media (for example temperature-control medium on the one hand and hydraulic oil, air and/or electrical signals/power supply on the other hand). It is, however, also possible to think of a use in which one and the same medium having different physical parameters is to be passed as a first medium and a second medium thermally separate from each other, for example if the medium is a temperature-control medium and the first medium is a temperature-control medium at a first temperature and the second medium is a temperature-control medium at a second temperature different from the first temperature.

Preferably, a temperature-control medium is used as the first medium.

The first media routing for the first medium is executed from the rotor to at least one connection at the rotary plate for the at least one first medium in the form of at least one line which has at least one (flexible) hose and/or a pipe. The at least one line extends between the first rotor part and the rotary shaft separately and/or independently from the connecting part which is in the form of a body having a peripheral surface (extending outside the peripheral surface of the connecting part).

The thermal separation between the first rotor part and the second rotor part and/or relative to the connecting part can be effected for example by the arrangement of a thermal insulating element and/or by the provision of an air gap.

The lines of the first media routing and/or the second media routing can be sheathed with a thermal insulation.

Preferably, lines which are in the form of hoses of the first media routing extend persistently starting from the first rotor part to a connecting location on the rotary plate (preferably in the form of hoses which are in one piece over the entire length, less preferably in the form of interconnected portions), which permits simple dismantling.

Such a hose can be of a first substantially straight configuration between the first rotor part and the point of reaching the rotary plate (if the hose is passed through a rotary shaft in the form of a hollow shaft, until exiting from the rotary shaft), and it can have a second straight configuration radially beyond the rotary plate, wherein the first and the second straight configurations are connected together by way of a configuration curved with a radius.

The direct hose communication and/or pipe communication of the first mediarouting from the first rotor part to the rotary plate affords some advantages:
 a reduction in the interfaces and thus the possible leakage locations,
 a smaller number of corrosion-susceptible components, metal parts can be made from corrosion-resistant steel,
 simple replacement of hoses and/or pipes is possible, and
 lower pressure losses by reduction in the interfaces and constrictions.

Preferably, the rotary plate for lines of the first media routing has openings in which the hoses and/or pipes are arranged in sunk relationship.

Common connecting blocks for the first and second media routings can be provided on the rotary plate or separate connections can be provided.

Depending on the respective nature of the second medium the second media routing can be designed as follows:
 for hydraulic oil, preferably passages in the connecting part are provided (particularly preferably in a casing of the connecting part), which can be connected to passages in the second rotor part and/or in the rotary shaft,
 for guiding electrical signals and/or electrical power supply, the connecting part can have a cable guide which can be connected to a cable guide arranged in the second rotor part and/or a cable guide arranged in the rotary shaft; if the rotary feedthrough is adapted for an endless rotation then a slip ring transmitter can be provided at or in the second rotor part, in the case of an oscillation mode of operation (for example up to) 240° it is possible to use torsion cables;
 for air, passages and/or pipes and/or hoses can be provided in the connecting part, which can be connected to passages and/or pipes and/or hoses in the second rotor part and/or in the rotary shaft; for air it is possible to use the same passages which can (possibly already) be provided for hydraulic oil.

Preferably, the rotary plate for the lines of the second media routing has apertures in which pipes and/or hoses are arranged in a sunk relationship.

Preferably, the connecting part is non-rotatably connected to both the first rotor part and also to the second rotor part.

Particularly preferably, the connecting part is in the form of a cylindrical body, preferably a shaft. As its base surface the cylindrical body can have for example a circle, an ellipse or a polygon (with the number of sides being greater than or equal to 3).

Preferably, the connecting part is connected releasably (for example by means of screws or bolts) to the rotary shaft and/or the rotor parts of the rotary feedthrough.

Preferably, the second media routing is designed at least for one medium in the casing of the (preferably cylindrical) body in the form of at least one passage, for example for a hydraulic oil.

Preferably, the rotary shaft is in the form of a hollow shaft and:
 the at least one hose and/or the at least one pipe of the first media routing is or are passed through the cavity in the hollow shaft, and/or
 a cable guide for a second medium in the form of electrical signals and/or an electrical power supply is passed through the cavity in the hollow shaft.

Passages for hydraulic oil or air can be provided in a casing of the rotary shaft.

If the rotary shaft is in the form of a hollow shaft, the at least one hose and/or the at least one pipe of the first media routing can extend through the hollow shaft to the rotary plate. In this embodiment, therefore, all media are passed by way of the hollow shaft to the rotary plate, wherein a heat influx from the first medium to the second medium or the second media in the region of the connecting part is minimized by thermal separation in such way that the first medium passes through the at least one hose or the at least one pipe either externally past the connecting part or extends in a cavity of the connecting part through same. In the region of the hollow shaft, thermal separation can be effected in such way that the at least one hose or the at least one pipe extends spaced from a peripheral surface of the hollow shaft, having a passage for the second medium, and/or spaced from a centrally arranged cable guide which is possibly present, through the hollow shaft. Alternatively or in addition, the at least one hose or the at least one pipe can be provided with an insulation.

In an embodiment of the connecting part, at least two transversely projecting wings are arranged at an end of the body of the connecting part that is towards the rotary shaft, and the at least one part of the second media routing of the connecting part is connected to openings arranged at the wings. Lines of the first media routing can pass into the rotary shaft in the free spaces remaining between the wings or by means of apertures arranged in the wings. Particularly preferably, there are at least three and preferably at least four or six wings projecting in a star configuration from the shaft. If there are wings, then each wing can have at least one feed connection and/or discharge connection for a media circuit and the corresponding feed connections and/or discharge connections can be arranged at the body of the connecting part.

The wings and the body of the connecting part preferably rest in a plane against the rotary shaft and are connected to the rotary shaft in that plane.

The connecting part can have at least one passive cooling device, preferably bores and/or slots. If a central opening is provided in the connecting part, a passive cooling device in the form of openings in the connecting part, that extend to the central opening and which are arranged at the casing of the connecting part, permits air exchange in respect of the central opening with the environment (in the manner of a chimney effect) and thus reduces a temperature loading in respect of the second media routing.

One embodiment of the invention provides for an active cooling, for example by water and/or by convection forced by a fan and/or an aspiration effect, for example:
 active cooling by the hollow shaft of the rotary feedthrough, connecting shaft and cable pipe, and/or
 a fan at the rotary feedthrough with a blowing direction to the mounting plate, and/or
 a fan at the mold mounting plate with a blowing direction to the rotary feedthrough.

Preferably, active cooling can be effected by an existing hydraulic circuit.

Preferably, a thermal insulating element can be arranged between the connecting part and the first rotor part and/or the second rotor part.

The invention makes it possible to optionally provide for an endless rotation of the rotary plate or an oscillation movement.

Particularly when the rotating apparatus has a horizontal axis of rotation, the stator of the rotary feedthrough for performing a linear movement along a central axis of the rotary shaft is connected to the rotary shaft and/or the rotor of the rotary feedthrough and that preferably provided there is a linear drive for performing the linear movement.

Preferably, a rotary drive is coupled to the rotor of the rotary feedthrough. The rotary movement is transmitted to the rotary shaft by the connecting part. Alternatively, the rotary drive can be coupled directly to the rotary plate or the rotary shaft. Coupling can be effected for example with a toothed ring.

The rotary drive can be, for example, hydraulic or electrical.

The closing unit having a rotating apparatus according to the invention can have two mold mounting plates which are moveable relative to each other. The rotating apparatus can be arranged between the mold mounting plates or can be mounted to one of the mold mounting plates or can be arranged between a mold mounting plate and a rotary cube.

The shaping machine can preferably be an injection molding machine, particularly preferably a plastic injection molding machine, an injection press or a press.

BRIEF DESCRIPTION OF THE DRAWINGS

Advantageous embodiments of the invention are discussed with reference to the Figures. Although all Figures show the configuration of a rotating apparatus with a horizontal axis of rotation, the invention is equally suitable for use with a vertical axis of rotation. In the drawings:

FIG. 3 shows a detail of FIG. 2, FIGS. 4a-d show various embodiments of a connecting part of a rotating apparatus according to the invention, FIGS. 5a, b show further various embodiments of a connecting part of a rotating apparatus according to the invention.

DETAILED DESCRIPTION OF THE INVENTION

Figure 1:
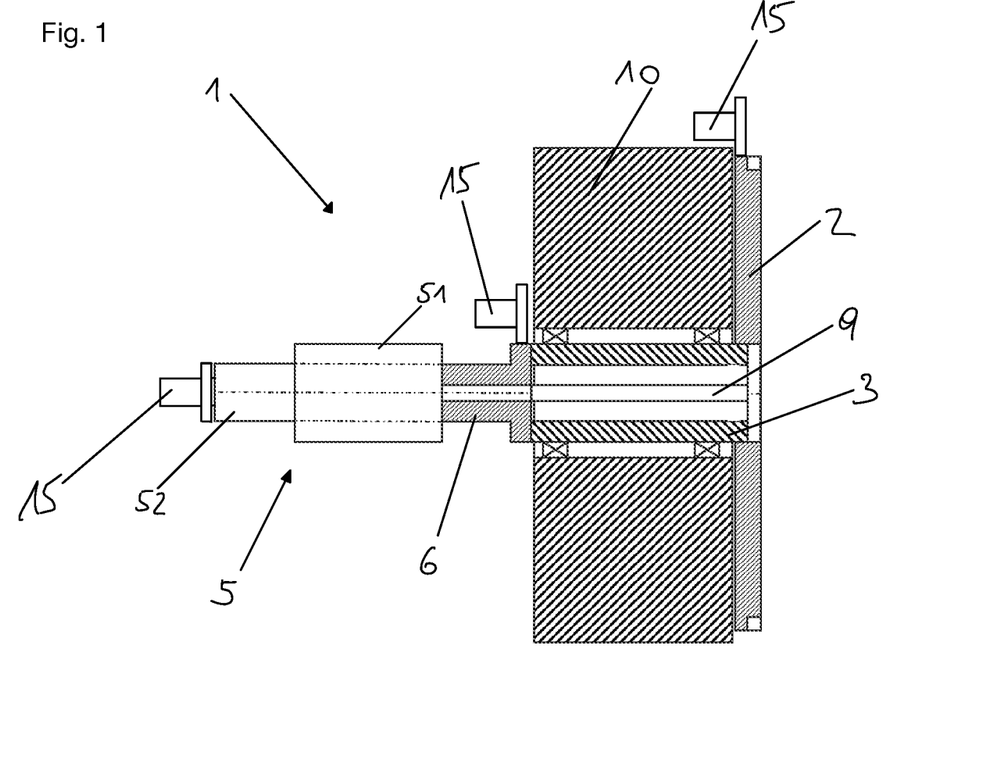
FIG. 1 is a first diagrammatic view of the basic structure of a rotating apparatus according to the invention, in which the rotor of the rotary feedthrough is adapted for endless rotation.

FIG. 1 shows a rotating apparatus 1 for a tool part of a shaping machine comprising a rotary plate 2 for mounting a tool part (not shown) and a rotary shaft 3 connected to the rotary plate 2. The rotary shaft 3 is mounted by way of rotary bearings in a passage opening of a mold mounting plate (the mold mounting plate is here mounted moveably on a machine bed that is not shown).

A stator 4 of the rotary feedthrough (together with the connections leading to the stator 4) and a linear drive for performing a linear movement in order to lift the rotary plate 2 (which here is in the form an index plate) off the mold mounting plate 10 are not shown and correspond to the state of the art. By way of example three different options are shown in respect of positions of a rotary drive 19.

This embodiment has a rotary feedthrough for an endless rotation comprising a rotor 5 connected to the rotary shaft 3 for feeding through at least two different media to the rotary plate 2, wherein the rotor 5 has a first rotor part 51 for feeding through at least one first medium (temperature-control medium) of the at least two different media and a second rotor part 52 for feeding through at least one second medium, different from the first medium, of the at least two different media. The first and the second rotor parts 51, 52 are thermally separated from each other in known fashion.

There is a connecting part 6 which is connected non-rotatably to the second rotor part 52 and the rotary shaft 3 and in which at least one part of the second media routing for the at least one second medium is provided.

Figure 2:
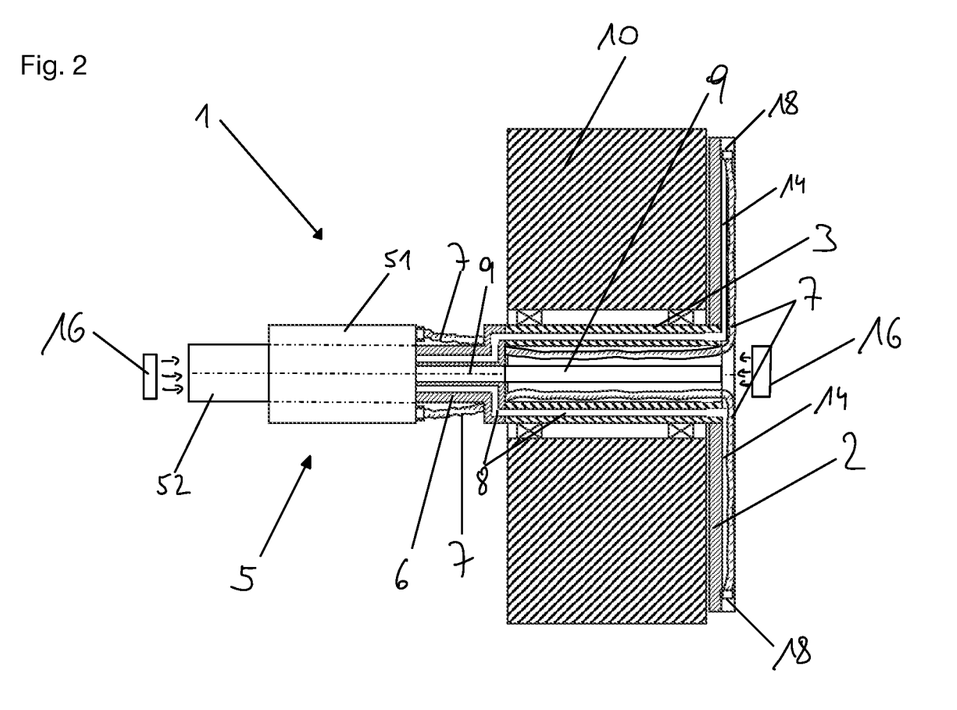
FIG. 2 shows the rotating apparatus of FIG. 1 with illustrated media routings.

The first media routing for the at least one first medium is not shown in FIG. 1 (but see FIG. 2). In regard to the second media routing, it is possible to see a cable guide 9, passages 8 for second medium in the form of hydraulic oil in the connecting part 6 and the rotary shaft 3 are not shown here but can be seen in FIG. 2.

FIG. 2 shows the rotating apparatus 1 of FIG. 1, wherein there can be seen additionally that the first media routing extends between the first rotor part 51 and connections at the rotary plate 2 in the form of hoses 7 (alternatively pipes would be possible portion-wise or over the entire length). The hoses 7 extend externally past the body 62 of the connecting part 6 by which thermal separation is ensured in that region and they enter by way of openings (not shown) into the rotary shaft 3 which, in this case, is in the form of a hollow shaft. They extend within a hollow space in the rotary shaft 3 to the connections at the rotary plate 2 which are arranged in connecting blocks 18, wherein thermal separation is also afforded in the region of the rotary shaft 3 by the spatial distance of the passages 8 and the cable guide 9. Optional fans 16 for active cooling are shown.

Figure 3:
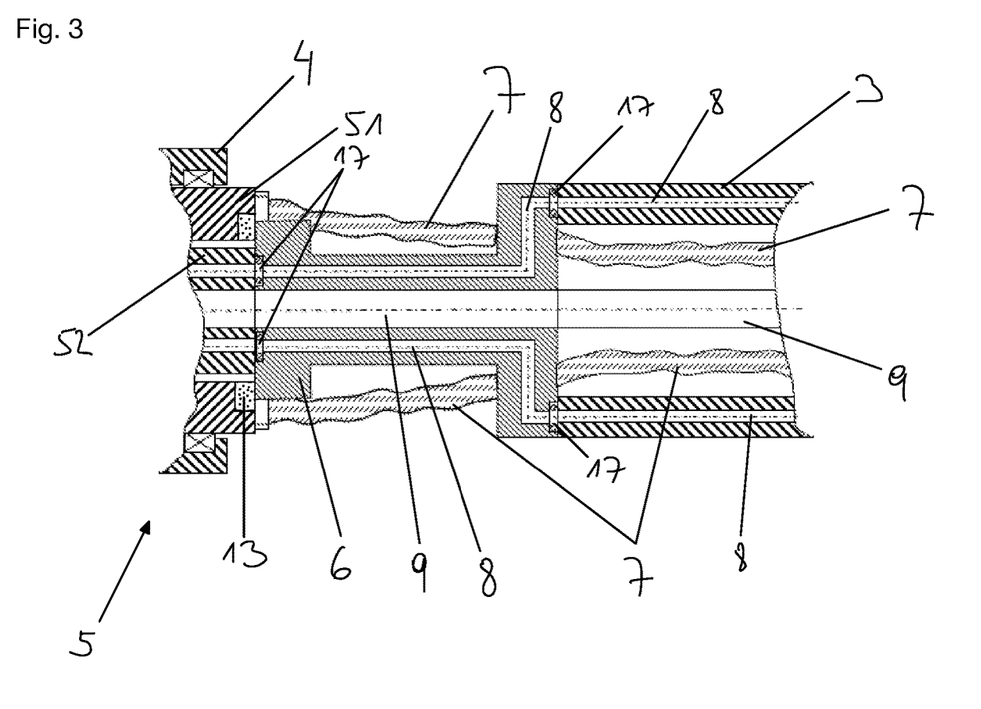

FIG. 3 shows a detail in relation to FIG. 2, in which the stator 4 of the rotary feedthrough is illustrated. A second medium in the form of hydraulic oil is passed by way of passages 8 through the connecting part 6 with the passages 8 being connected with oil-carrying passages 8 in the second rotor part 52 and oil-carrying passages 8 in the casing of the rotary shaft 3. For sealing oil seals 17 are provided. The connecting part 6 has a central cable guide 9 for power lines (these are not shown), that aligns with cable guides 9 in the second rotor part 52 and rotary shaft 3. FIG. 3 shows a thermal insulating element 13 which thermally separates the first rotor part 51 and the connecting part 6. Thermal separation of the first rotor part 51 from the second rotor part 52 is afforded by an air gap between the first rotor part 51 and the second rotor part 52. The connecting part 6 is non-rotatably connected to the first rotor part 51 and the second rotor part 52.

Figure 4A:
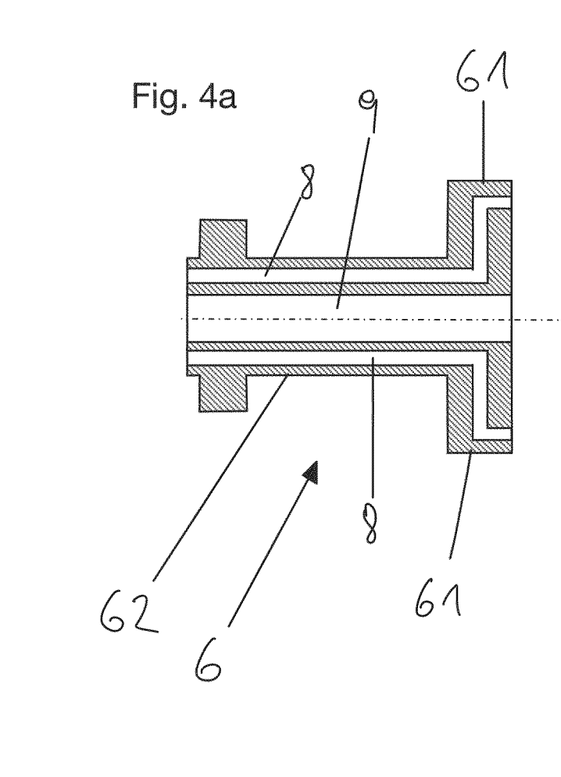
Figures 4B, 4C, 4D:
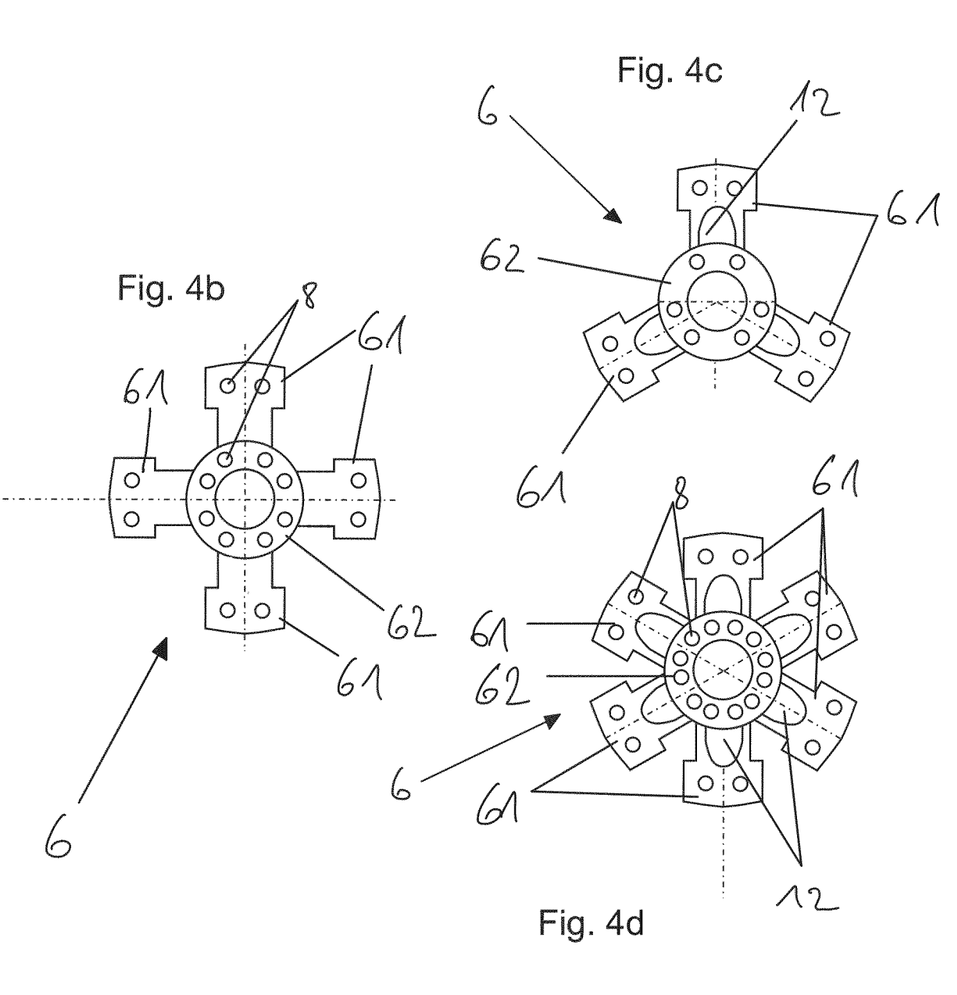

FIGS. 4a-d show various embodiments of the connecting part 6, wherein all embodiments (apart from optional apertures 12) have the same cross-section as shown in FIG. 4a and differ from each other only in the number of transversely projecting wings 61 arranged in a star shape. Arranged at the wings are two respective openings communicating with the passages 8 of the second media routing. In some of the illustrated embodiments the wings 61 have apertures 12, through which the lines of the first media routing can extend (not shown). Preferably the lines of the first media routing extend between the wings 61 (not shown).

Figure 5A:
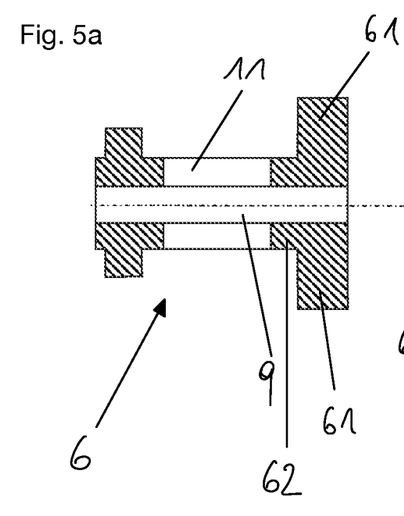
Figure 5B:
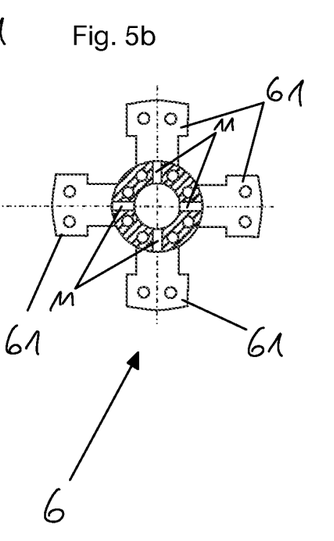

In the embodiment of FIGS. 5a and 5b (here shown only in the variant with four wings 61), the connecting part 6 has a passive cooling device 11 in the form of openings.

Figure 6:
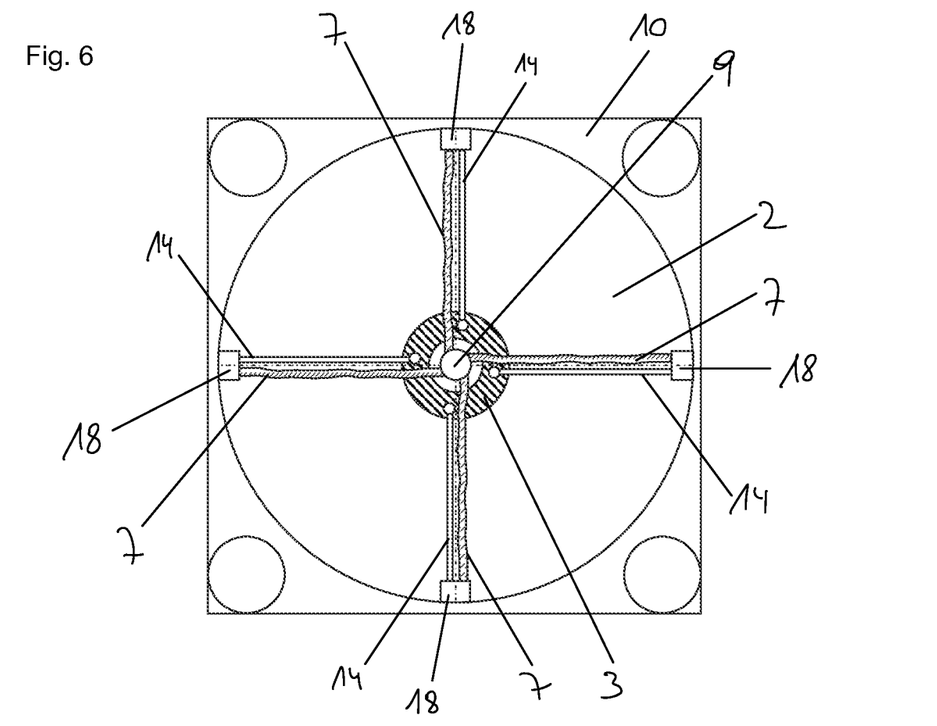
FIG. 6 is a plan view of a mold mounting plate with rotating apparatus.

FIG. 6 shows a plan view of the mold mounting plate 10 and the rotary plate 2, wherein it can be seen that in this embodiment common connecting blocks 18 are provided for the media routing, by way of which the connection to a tool part or other components arranged in the region of the rotary plate 2 can be effected. Alternatively, the connections of the first and second media routing can be arranged separately from each other.

Figure 7:
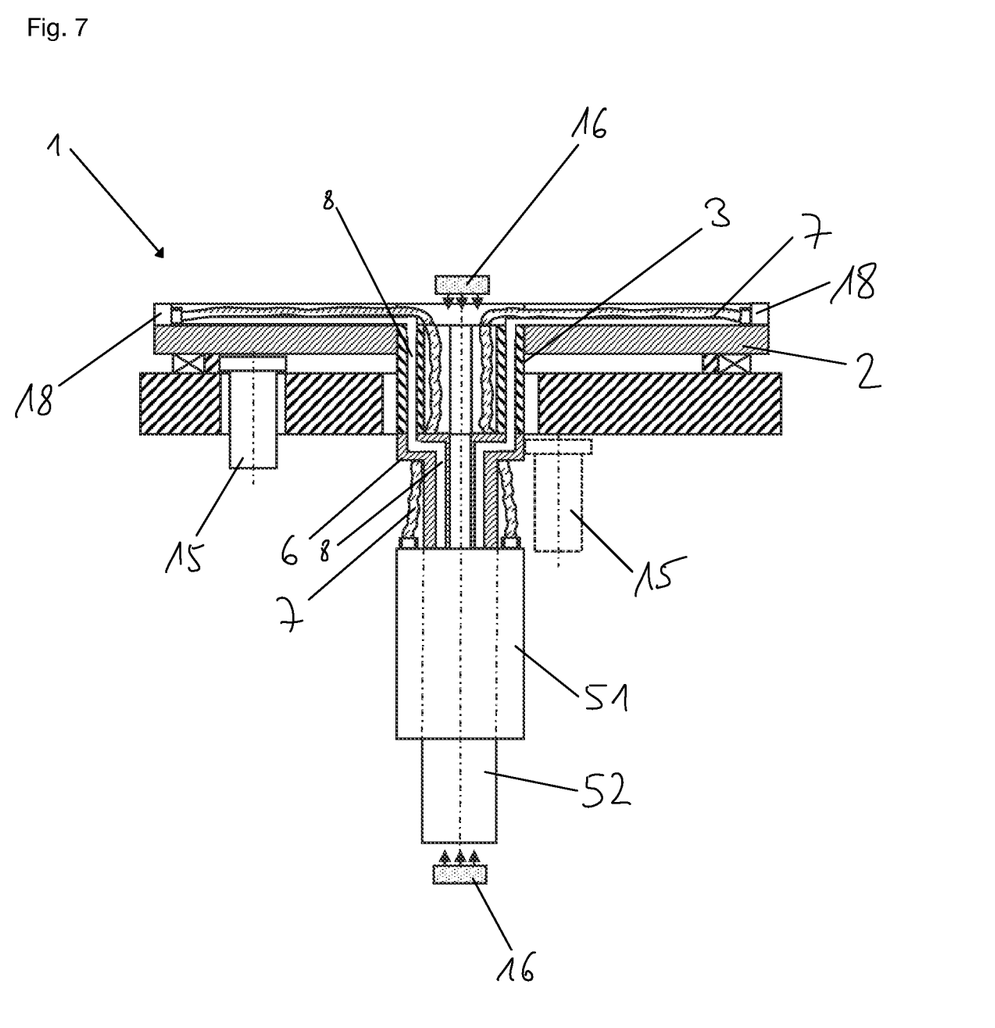
FIG. 7 shows a further embodiment of a rotating apparatus according to the invention with a vertical axis of rotation.

In the embodiment in FIG. 7, the rotating apparatus 1 has a vertical axis of rotation. Optional fans 16 are provided and alternative positioning options for the rotary drive 15 are shown.

LIST OF REFERENCES 1 rotating apparatus for a tool part of a shaping machine
2 rotary plate
3 rotary shaft for rotary plate
4 stator
5 rotor of a rotary feedthrough
   51 first rotor part
   52 second rotor part
6 connecting part
   61 wing of the connecting part
   62 body of the connecting part
7 hose
8 passage
9 cable guide
10 mold mounting plate
11 passive cooling device
12 aperture
13 insulating element
14 hydraulic pipe
15 rotary drive
16 fan
17 oil seal (for example O-ring)
18 connecting block

The invention claimed is:

1. A rotating apparatus for a tool part of a shaping machine, the rotating apparatus comprising:
   a rotary plate for mounting a tool part;
   a rotary shaft connected to the rotary plate;
   a rotary feedthrough comprising a stator and a rotor connected to the rotary shaft for feeding through at least two media to the rotary plate, wherein the rotor has a first rotor part for passing through a first medium of the at least two media and a second rotor part for feeding through a second medium, wherein the first rotor part and the second rotor part are thermally separated from each other;
   a first media routing from the rotor to a connection at the rotary plate for the first medium; and
   a connecting part non-rotatably connected to the second rotor part and the rotary shaft, at least one part of a second media routing for the second medium being provided in the connecting part,
   wherein the connecting part is a body having a peripheral surface, and
   wherein the first media routing is a hose and/or pipe for the first medium and extends from the first rotor part externally past the peripheral surface of the connecting part to the rotary plate.

2. The rotating apparatus as set forth in claim 1, wherein the rotary shaft is a hollow shaft.

3. The rotating apparatus as set forth in claim 2, wherein the hose and/or the pipe of the first media routing extends from the connection at the first rotor part through the hollow shaft to the rotary plate.

4. The rotating apparatus as set forth in claim 2, wherein the second media routing leads the second medium from the second rotor part by way of the at least one part of the second media routing of the connecting part and a passage provided in the hollow shaft to the rotary plate.

5. The rotating apparatus as set forth in claim 1, wherein the connecting part includes a cylindrical body.

6. The rotating apparatus as set forth in claim 5, wherein the connecting part is a shaft, and the at least one part of the second media routing of the connecting part is a passage that extends along a longitudinal axis of the connecting part and is provided in a peripheral surface of the connecting part.

7. The rotating apparatus as set forth in claim 1, wherein the connecting part has a cable guide for a second medium in the form of electrical signals and/or an electrical power supply.

8. The rotating apparatus as set forth in claim 1, wherein at least two transversely projecting wings are arranged at an end directed towards the rotary shaft of the body of the connecting part and the at least one part of the second media routing of the connecting part is connected to openings arranged at the wings.

9. The rotating apparatus as set forth in claim 8, further comprising at least three wings projecting in a star shape from the body of the connecting part.

10. The rotating apparatus as set forth in claim 9, wherein the at least three wings is at least four or six wings projecting in a star shape from the body of the connecting part.

11. The rotating apparatus as set forth in claim 1, wherein the connecting part has a passive cooling device.

12. The rotating apparatus as set forth in claim 11, wherein the passive cooling device is bores and/or slots.

13. The rotating apparatus as set forth in claim 1, wherein the connecting part is connected to the first rotor part.

14. The rotating apparatus as set forth in claim 13, wherein the connecting part is connected to the first rotor part by a thermal insulating element.

15. The rotating apparatus as set forth in claim 1, wherein the rotor of the rotary feedthrough is adapted for endless rotation.

16. The rotating apparatus as set forth in claim 1, wherein the stator of the rotary feedthrough for performing a linear movement along a central axis of the rotary shaft is connected to the rotary shaft and/or the rotor of the rotary feedthrough.

17. The rotating apparatus as set forth in claim 16, further comprising a linear drive for performing the linear movement.

18. The rotating apparatus as set forth in claim 1, wherein:
   the rotor of the rotary feedthrough is connected to a rotary drive for rotating the rotor, the connecting part connected thereto, and the rotary shaft connected thereto, or
   a rotary drive is coupled directly to the rotary plate, or
   a rotary drive is coupled directly to the rotary shaft.

19. The rotating apparatus as set forth in claim 1, wherein the second medium is different from the first medium.

20. A closing unit for a shaping machine comprising the rotating apparatus as set forth in claim 1.

21. The closing unit as set forth in claim 20, wherein the rotating apparatus has a vertical axis of rotation and is arranged between two mold mounting plates moveable relative to each other, or is arranged between a mold mounting plate and a rotary cube of the closing unit.

22. The closing unit as set forth in claim 20, wherein the rotating apparatus has a horizontal axis of rotation and is mounted to a mold mounting plate or a rotary cube of the closing unit.

23. A shaping machine comprising the closing unit as set forth in claim 20.

24. The shaping machine of claim 23, wherein the shaping machine is an injection molding machine.

* * * * *